D. E. ROSS.
DIFFERENTIAL GEARING AND REVERSING MECHANISM THEREFOR.
APPLICATION FILED APR. 13, 1906.

929,884.

Patented Aug. 3, 1909.

WITNESSES:
Brennan B. West.
Ludo H. Keller.

INVENTOR
David E. Ross.
BY
Bates, Fouts & Hull
ATTORNEYS.

UNITED STATES PATENT OFFICE.

DAVID E. ROSS, OF BROOKSTON, INDIANA, ASSIGNOR TO ROSS GEAR AND TOOL COMPANY, OF LA FAYETTE, INDIANA, A CORPORATION OF INDIANA.

DIFFERENTIAL GEARING AND REVERSING MECHANISM THEREFOR.

No. 929,884. Specification of Letters Patent. Patented Aug. 3, 1909.

Application filed April 13, 1906. Serial No. 311,465.

*To all whom it may concern:*

Be it known that I, DAVID E. ROSS, residing at Brookston, in the county of White and State of Indiana, have invented a certain new and useful Improvement in Differential Gearing and Reversing Mechanism Therefor, of which the following is a full, clear, and exact description, reference being had to the accompanying drawings.

This invention relates to differential gearing for self-propelled vehicles, and it has for its objects the simplification of such gearing, and the easy and ready removal and assembling of said gearing when it is necessary to make repairs.

Further objects of the invention are the provision of means for reversing the direction of the rotation of the axle sections, and for rendering all of the wearing parts of the mechanism adjustable, so that the bearings may be tightened and kept in proper condition.

Various other features of the invention will be hereinafter described and particularly pointed out in the claims.

In the drawings accompanying this application.

In the construction, operation and repair of automobiles, considerable difficulty has been experienced in securing a construction which permits of the ready accessibility and removal of the parts of the differential gearing. In the following specification and in the accompanying drawings, I disclose a form of construction in which the entire set of driving gears may be bodily removed from the machine with very little difficulty and without so much as removing the wheels of the vehicle. Combined with these features of ready accessibility and removal are means for readily reversing the direction of rotation of the axle sections, and for giving the proper adjustment to all of the bearings so as to take up all wear therein.

Figure 3:
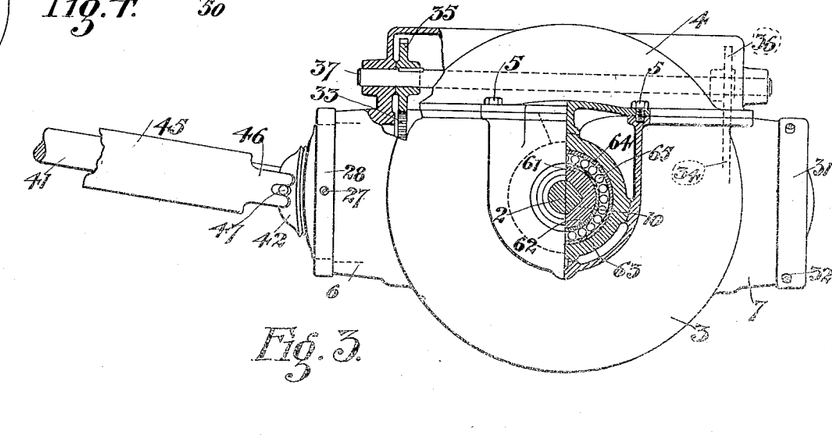
Fig. 3 is a section taken on the broken line 3—3 of Fig. 1, certain of the parts of the casing being broken away in order to more clearly illustrate the reversing mechanism.

Referring now more particularly to the drawings, in which similar reference characters designate like parts throughout the several views, 1 and 2 represent the axle sections, or the revoluble driven members, which are placed end to end, and which are properly journaled at their inner ends within the casing for the differential gearing, and are properly supported in their outer ends by the hub of the vehicle wheel. The casing consists of the lower main casting, said casing being provided with opposed openings for the axle sections, hereinafter described, and the tubular shells 3 alined with the openings and having their axes substantially coincident with the axes of said openings. Upon the said main casting of the casing I mount a cap plate 4, said cap plate being secured in position by bolts 5 which pass therethrough and are tapped into the lower casting, as shown in Fig. 3. Projecting forwardly from the central part of the casting substantially midway between the said opposed openings and tubular shells 3 is a third opening and a tubular extension 6, and a similar extension 7 projects rearwardly from the central part of said casting. These tubular extensions are bored so as to form bearings for eccentric journal boxes 8 and 9, as hereinafter more fully described.

Figure 1:
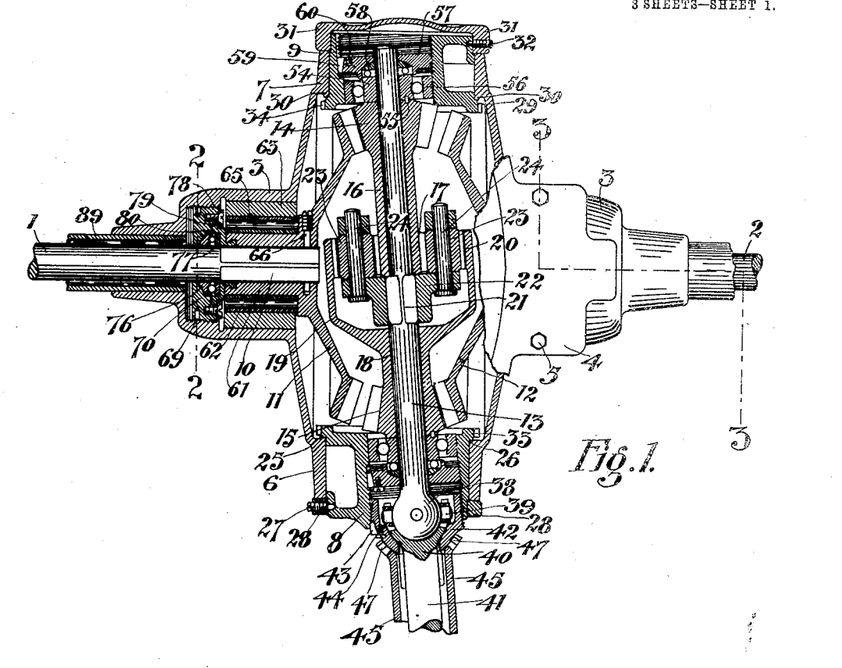
Figure 1 is a plan view, partly in section and partly in elevation of the differential gearing and the reversing mechanism, said view also showing portions of the axle sections, and the construction whereby the said sections and gearing may be readily removed and adjusted.

The inner ends of the axle sections are square, as shown at 10 in Figs. 1 and 3, and upon the squared portions of these axle sections are mounted bevel driven gears 11 and 12, said gears being hollowed or concaved on their adjacent faces so as to form a space for the accommodation of the compensating or equalizing gearing through which motion is transmitted to the bevel gears.

Extending through the casing between the bevel gears and substantially in the same horizontal plane therewith is a section 13 of the driving shaft, or revoluble driving member, said driving member being journaled at its rear end in the journal box 9 and its forward end in the journal box 8. Loosely mounted upon this section of the driving shaft are driving or transmitting gears or pinions 14 and 15, said pinions being adapted to be thrown into operative engagement with the bevel gears 11 and 12 on the axle sections. The pinion 14 has a forwardly extending sleeve 16, and the forward end of said sleeve is provided with teeth constituting a spur gear at 17. The pinion 15 has a rearwardly extending sleeve 18, which sleeve at its rearward end swells outwardly into an annular ring 19, said ring being provided near its rearward rim with internal gear teeth so as to form an internal gear at 20. Just at the rear of the sleeve 18, and within the ring 19 of the pinion 15 the shaft 13 is provided with a squared portion, as is shown at 21, and mounted upon said squared portion and turning therewith is a spider or frame 22, said spider being provided with a square opening so as to fit the squared portion of the shaft therein. Carried by the said spider, and meshing with the spur gear 17 and with the annular gear 20 are planetary gears 23, said gears being secured to the spider by means of bolts 24, said bolts forming journal pins for the planetary gears, the latter gears being held on the bolts by means of nuts, as shown. From this description it will be seen that, when the driving shaft section 13 is turned, the spider will likewise be turned, and, through the engagement of the planetary gears thereon with the said spur and annular gears 17 and 20 respectively, the bevel pinions 14 and 15 will be turned, said bevel pinions transmitting their motion to the bevel gears 11 and 12 to turn the axle sections. These connections not only serve to drive the axle sections, but they permit of said sections being differentially driven, as is necessary in turning corners.

In order to secure the forward journal box 8 within the tubular extension 6 of the main casting, I provide the same at its rear end with a shoulder 25, which bears against a corresponding shoulder 26 on said tubular extension; and on the forward end of the journal box I attach, by means of set screws 27, a ring 28, said ring bearing against the forward end of said tubular extension. This construction prevents the lateral movement of the journal box within said extension, unless the said ring 28 has been previously removed. At the same time, the journal box may be rotated within the bored part of the tubular extension. The journal box 9 is similarly held in position within the extension 7 by forming thereon a shoulder 29, said shoulder engaging with a similar shoulder 30, within the extension. This construction prevents the box from moving rearwardly, and the same is prevented from forward movement by securing thereto a cap plate 31, said cap plate being held in position by set screws 32. The cap plate bears at its forward edge against the rear end of the tubular extension; and, in order to prevent the entrance of dust within the gear casing, the cap extends entirely across the rear end of the extension 7.

As will be seen by reference to Fig. 1, the shaft section or revoluble driving member 13 does not normally stand perpendicular with respect to the axle sections, but is inclined from said axle sections at an angle other than a right angle for the purpose of throwing the bevel pinion 14 into mesh with the rear part of one of the gears on the axle sections, say the gear 11, and the bevel pinion into mesh with the forward part of the gear 12. It will be understood that if the shaft section were turned so as to throw the pinion 14 into mesh with the gear 12 and the pinion 15 into mesh with the gear 11, the direction of rotation of the axle sections would be reversed. For the purpose of thus changing the position of the shaft section 13, the bearings for the same are placed eccentrically in the journal boxes 8 and 9, and said boxes are normally turned through an angle of 180 degrees with respect to each other, and are maintained in this respective position. That is to say, if one of the journal boxes is turned, the other box will be correspondingly turned so as to maintain the difference of 180 degrees between them.

In order to turn the journal boxes 8 and 9, I provide each of the same with a spur 33 and 34 respectively, said gears being on the inner ends of the boxes and within the casing. Meshing with the gears 33 and 34 are pinions 35 and 36 respectively, said pinions being secured to a shaft 37 that is journaled in the cap 4 of the casing. By this construction, any movement that is imparted to the journal box 8 will be transmitted to the journal box 9.

The forward end of the shaft section 13 is provided with a ball head 38, from which project a plurality of pins 39. These pins are operated upon so as to turn the shaft section by engaging portions of a ball socket 40, the socket accurately fitting the surface of the head 38. The socket 40 is formed upon the rear end of the section 41 of the drive shaft. This ball and socket connection between the shaft sections 13 and 41 permits of the relative movement which always takes place between the driving motor and the gear casing, said driving motor being mounted upon the box or body of the vehicle. Screwed within the interior of the journal box 8 is a retaining cap or bushing 42, said retaining cap, after adjustment, being locked to the journal box 8 by means of a key 43, said key being held in position by the head of a set screw 44. The forward portion of the cap 42 is rounded so as to be concentric with the ball head 38 on the shaft section 13. Surrounding the section 41 of the drive shaft is a sleeve 45, said sleeve at its rearward end having forked projections 46 (see Fig. 3) that engage with pins 47 on the retaining cap 42. At its forward end the sleeve 45 is journaled in a ring 48 that is trunnioned in bearings supported by a frame piece 49 depending from the box or body of the vehicle.

Keyed or otherwise secured to the forward end of the sleeve 45 is a bevel gear 50, said gear meshing with the segment 51 that is carried on the lower end of a rod or shaft 52, said shaft being provided with a hand wheel 53 whereby the shaft may be turned.

Any other suitable form of mechanism may be employed for imparting rotation to the journal boxes, but from the above description it will be understood that when the hand wheel 53 is turned, the sleeve 45 will be rotated and the retaining cap or bushing 42 will be turned thereby. As this bushing is keyed to the interior of the journal box 8, said box will also be rotated within its bearings in the extension 6 of the casing, and the motion of this journal box will be transmitted through the shaft 37 to the rear journal box 9. If this rotation is sufficient to turn the journal boxes through 180 degrees, the shaft section 13 will be moved so that the pinions thereon will be thrown out of mesh with the bevel gears with which they formerly engaged and into mesh with the gears from which they were formerly disengaged, so that the direction of rotation of the axle sections will be reversed. If the hand wheel 53 is turned so as to rotate the journal boxes through but 90 degrees, the shaft section 13 will stand substantially perpendicular to the axle sections, and the bevel pinions 14 and 15 will be entirely out of mesh with the gears 11 and 12.

The bearings for the ends of the shaft section 13 are contained within the journal boxes 8 and 9; and as these bearings are the same at either end of the shaft, I will confine my description to the bearing in the journal box 9. As will be hereinafter explained, I desire to sometimes draw the shaft section 13 entirely out of the gear casing; and, for this reason, it is desirable that the journal bearings therefor be so mounted within the journal boxes that they remain in position while the shaft is being removed. At the rear end of the bevel pinion 14 and surrounding the shaft section is a collar 54, said collar being caused to rotate with the pinion by pins 55 that project partly into the collar and partly into the pinion. This collar forms one part of the side ball bearing, the other part of said bearing consisting of a ring 56, the collar and ring having a race-way for the balls. To take up end motion, a nut 57 is screwed into the end of the box 9, said nut surrounding the end of the shaft section, and having a concaved inner face, said face fitting the outer face of a bearing member 58. This member has part of the race-way for the end ball bearing, the other part of the race-way being within the end of the collar 54. From this description it will be seen that when the nut 57 is screwed inwardly, the member 58 will compress the balls in the end bearing and thus take up the wear in an endwise direction. The nut 57 is locked into engagement with the box bearing 9 by means of a key 59 that is held in position by means of a set screw 60, said screw being tapped into the nut and its head engaging with the outer end of the key. As stated, the inner ends of the axle sections 1 and 2 are squared at 10 so as to fit into squared openings in the bevel gears 11 and 12. These latter gears are provided with hub extensions 61, on the outer surface of which fits a bushing 62. (See Fig. 3.) Within the lateral hub extensions of the main casting 3 there are mounted journal boxes 63, the inner faces of which are lined with bushings 64. The rollers 65 for the bearings roll between the bushings 62 and 64. The gear wheels 11 and 12 are held upon their respective axle sections by means of pins 66 that are inserted into openings that pass through the end of the axle sections and through one side of the hubs of the gear wheels, the outer ends of said pins being threaded so that they may be screwed into a tapped portion of the opening in the hub.

Figure 2:
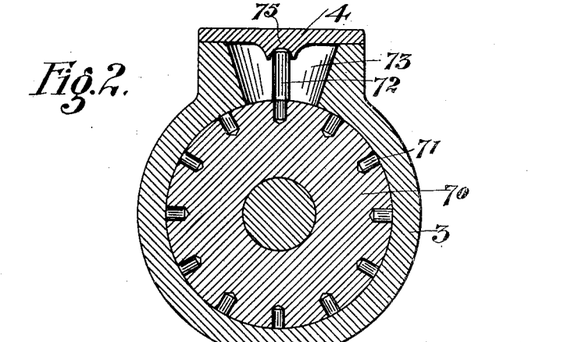
Fig. 2 is a section taken on the line 2—2 of Fig. 1, and showing the means for securing the proper adjustment of the driven gears with respect to the driving pinions.
Figure 5:
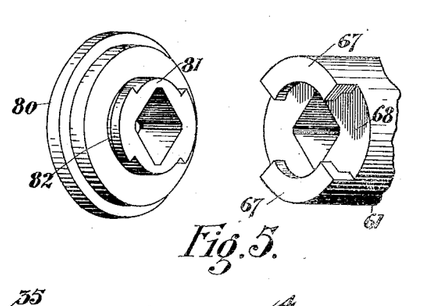
Fig. 5 is a detail view in perspective of the means for holding the driven gears on the axle sections in proper position.

As shown in Fig. 5, the outer end of the hubs 61 of the bevel gears 11 and 12 are formed with angular flange projections 67, said projections extending for substantially 90 degrees about the ends of the hubs, leaving spaces 68 therebetween. The interior of the hub sections of the casting 3 are screw-threaded interiorly at 69, and screwed within the same from the interior are adjusting nuts 70. This nut is shown enlarged in Fig. 2, from which figure it will be seen that it is provided on its outer face with sockets 71 into which is inserted a pin 72 for turning the nut, said pin being movable for this purpose within a socket 73 in the casting 3. For holding the nut in any of its adjusted positions, I provide on the inner face of the cap plate 4 a projection 75 having a depression therein into which the end of the pin 72 is adapted to project so as to be held. The nut 70 is formed on its inner face with a rounded depression which fits the outer face of a ball bearing member 76, between which and the member 77 the balls for the end bearings are contained. The member 77 is adjustable toward the member 76 for the purpose of taking up wear by means of set screws 78 that are tapped into the nut 70, said set screws 78 pasing through a ring 79 that bears against a member 80, said member pressing against the inner face of the bearing member 77. This member 80 is shown in perspective in Fig. 5, from which it will be seen that it is provided with a hub extension 81 that is adapted to extend between the angular projections 67 on the hub 61 of the gear wheels, and with angular projections 82 that are adapted to lock behind the projections 67 on said hubs. This construction holds the gear wheels and the axle sections rigidly in position with respect to the gear, it being understood, and as appearing from Fig. 5, that the member 80 also has a squared opening therethrough and fits upon the squared portion 10 of the axle sections.

Figure 6:
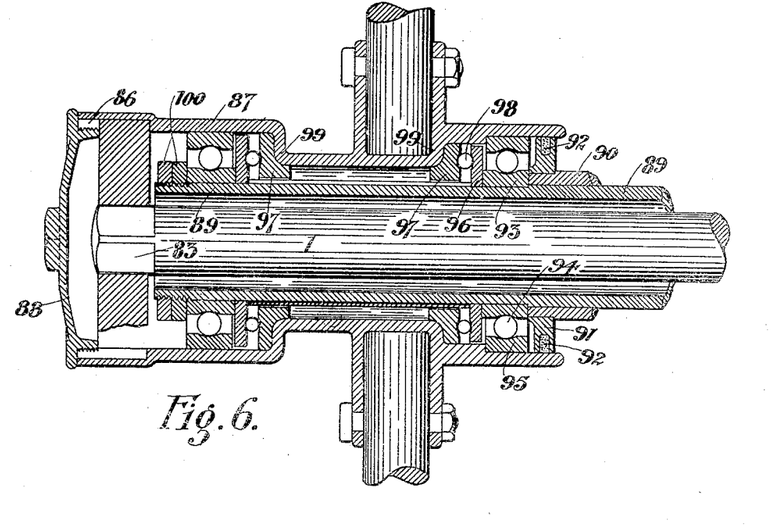
Fig. 6 is a sectional view through the hub of one of the wheels of the vehicle, showing the construction of the bearing, and also the means for driving the wheel by its axle section.
Figure 7:
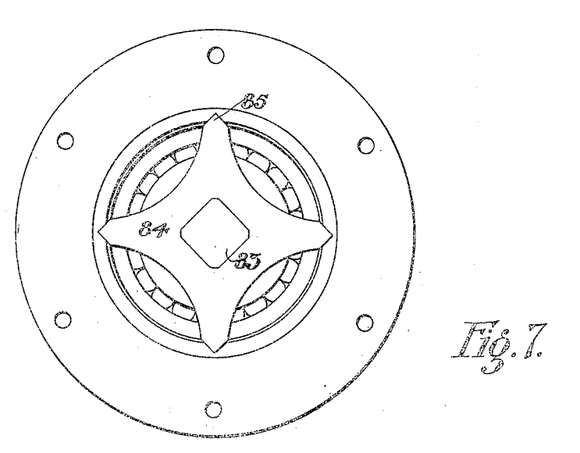
Fig. 7 is an end elevation of the structure shown in Fig. 6 with the cap plate at the end of the hub removed.

As will be seen by reference to Figs. 6 and 7, the axle sections extend outwardly into the hubs of the vehicle wheels, and are squared on their outer ends, as shown at 83. Fitted to this squared end of the axle section is a locking member 84, said member being provided with a plurality of radial arms, the outer ends of which are formed into engaging portions 85, the said outer ends of these arms normally engaging with locking grooves 86, that are formed in the inner surface of the end of the hub 87 of the vehicle wheel. The member 84 is held in position upon the axle sections by a cap plate 88 which screws into the outer end of the hub 87.

89 is a tubular sleeve which extends through from the gear casing outwardly about the axle section, and it is upon said sleeve that the vehicle wheel is journaled. At the inner end of the hub 87 a collar 90 is brazed or otherwise secured to the sleeve, said collar forming an abutment for the bearings of the vehicle wheel. In order to prevent the entrance of dust within said bearing, a ring 91, having a dust proof washer 92 therein, closes the annular space between the collar 90 and the inner end of the hub. Surrounding the sleeve 89 at the outer end of the collar 90 is a ball bearing member 93, said member having a race-way for the balls 94 of the side ball bearings, said balls also traveling in a race-way in the outer member 95 of the bearing. In order to take up any endwise movement of the hub, I employ a set of end ball bearings, which consist of a bearing member 96 and a corresponding member 97 having the raceways in their adjacent faces for the balls 98. The bearings thus described are located at the inner end of the hub, but the corresponding bearings, not necessary here to describe, are located at the outer end of the hub. Between the bearing members 97 of the end bearings, the hub 87 is constricted so as to form annular shoulders or flanges 99 against which the members 97 engage. The outer end of the sleeve 89 is screw-threaded, and upon said screw-threaded portion nuts 100 are employed for the purpose of taking up any endwise motion in the bearings.

Figure 4:
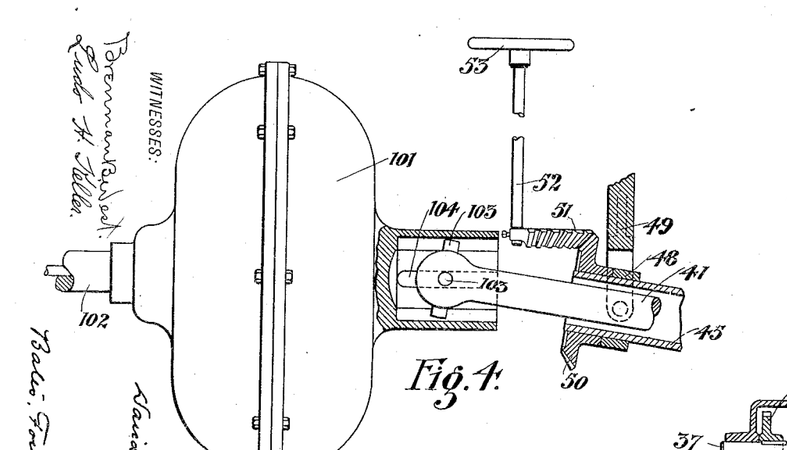
Fig. 4 is a view showing the connections between the mechanism, shown in Fig. 3 and the driving motor, and also showing the means for operating the reversing mechanism, parts of said view being in section and parts in elevation.

In Fig. 4, I have indicated conventionally a change of speed device 101, said device connecting the section 102 of the drive shaft with the section 41 thereof. Since this device forms no part of my present invention, I do not deem it necessary to describe the same with any greater particularity at the present time, further than to state that the change of speed device is connected with the section 41 of the drive shaft by means of pins 103 on the shaft section, said pins engaging with elongated slots 104 on the driven member of the change of speed device. This construction permits of the vertical movement of the device 101, and also permits of the rearward movement of the shaft section 41 whereby it may be disengaged at its rearward end from the rear shaft section 13, as hereinafter described.

Having thus described the construction entering into my invention, I now desire to set forth the manner in which the same is assembled. The part 3 of the gear casing and the vehicle wheels being in position, the bearings in the gearing casing are placed in their approximate positions, the journal boxes 8 and 9 being turned 180 degrees with respect to each other, and being so positioned that the shaft section 13 will extend perpendicularly to the axle sections. The bevel pinions 14 and 15 and the planetary gearing are then placed within the gear casing, and the shaft section 13 is inserted through its forward bearing and through the said bevel gears until its rear end becomes journaled in its rear bearings. The shaft section 13 and the retaining cap 42 are screwed approximately into position so as to hold the shaft sections in engagement. Up to this time it will be understood that the axle sections 1 and 2 have not been inserted, although the vehicle wheels are in position. These sections are now inserted from the outer end of the hubs until the inner ends of said sections engage with the squared opening in the members 80, shown in Fig. 5. The bevel gears 11 and 12 are then dropped into position in front of the locking projections 82 on the said member 80, and the gear wheels are thrust outwardly and then turned through 90 degrees so as to cause the annular projections 82 on the member 80 to lock behind the angular extensions 67 on the ends of the hubs 61 of the gear wheels. When turned to this position, the axle sections 1 and 2 may be inserted their full distances, and then be secured by the pins 66. When in this position, the axle sections themselves hold the hubs and the members 80 in locked position so that there will be no endwise play of these parts. The locking member 84 is then placed over the outer end of the axle sections and made to engage with the grooves 86 in the hub of the vehicle wheel, after which the cap plate 88 is screwed into position. The gearing within the casing being now in position, the cap plate 4 of the casing is bolted into place, with the pinions 35 and 36 in mesh with the gears 33 and 34 on the journal boxes, after which the various bearings are properly adjusted and locked. In dismantling the machine, the reverse operation is performed, the axle sections being withdrawn from the hubs, and the shaft section 13 being withdrawn from the gear casing, thereby leaving the parts free to be lifted bodily from their casings for the purpose of repair. In order to remove the shaft section 13, the retaining cap 42 must first be removed, after which the shaft section 41 is drawn forwardly out of engagement with the pins on the head of section 13.

When a non-reversible axle is desired, the counter shaft 37 and the gears 35 and 36 may be dispensed with. In this case the eccentric journal boxes 8 and 9 will not be needed, and the shaft section 13 will be journaled in the extensions 6 and 7 of the gear casing.

Various changes in the details of the construction herein described may be made without departing from the spirit of my invention, and I desire it to be understood that the following claims are not limited any further than is made necessary by the specific terms employed or by the prior state of the art.

I claim:

1. In a vehicle, an axle section having flattened portions on either end, a gear fitting one end of said section, means for driving said gear whereby the axle section may be driven, a locking member fitting the opposite flattened end of the axle section and engaging with the vehicle wheel, and means for normally retaining the locking member and the said wheel in engagement.

2. In a vehicle, an axle section having squared portions on either end, a gear fitting one end of said section, means for driving said gear whereby the axle section may be driven, a locking member fitting the opposite squared end of the axle section and engaging with the hub of the vehicle wheel, and a cap for normally retaining the locking member in engagement with the hub of the wheel whereby the latter is driven with the axle section.

3. In a vehicle, an axle section having a flattened portion at each of its ends, a driving gear fitting one of the ends of said axle section, means for turning said gear whereby the axle section may be driven, a sleeve surrounding the axle section, a vehicle wheel journaled upon said sleeve, a locking member fitted to the opposite flattened end of the axle section and engaging with the hub of the vehicle wheel, whereby said wheel is driven with the axle section, and means for normally retaining the axle section within said sleeve and in engagement with said gear, the construction being such that the said section may be moved bodily from the said sleeve and gear, whereby the gear may be removed without disturbing the vehicle wheel.

4. In a vehicle, a gear casing, an axle section having a squared portion at each of its ends, a driving gear within the casing and fitting one of the ends of said axle section, means for turning said gear whereby the axle section may be driven, a sleeve projecting from the casing and surrounding the axle section, a vehicle wheel journaled upon said sleeve, a locking member fitted to the opposite squared end of the axle section and engaging with the interior of the hub of the vehicle wheel, whereby said wheel is driven with the axle section, and a cap for normally retaining the axle section within said sleeve and in engagement with said gear, the construction being such that the said section may be withdrawn bodily from the said sleeve and gear, whereby the gear may be removed from the casing without disturbing the vehicle wheel.

5. In a vehicle, a pair of axle sections, gears having driving connections with said axle sections, a shaft passing across the faces of said gears, a pair of pinions on said shaft, said pinions being on opposite sides of the axle sections, differential gearing forming driving connection between the said pinions and shaft, and means for changing the position of the shaft so as to bring one pinion into mesh with one of the gears and for simultaneously throwing the other pinion out of mesh therewith, whereby the direction of motion of the axle section is reversed.

6. In a reversing mechanism, a driven member, a gear having driving connection with said member, a shaft passing across the face of said gear, a pair of pinions on said shaft, said pinions being on opposite sides of the driven member, differential gearing forming driving connections between the said pinions and shaft, and means for changing the position of the shaft so as to bring one pinion into mesh with the said gear and for simultaneously throwing the other pinion out of mesh therewith, whereby the direction of motion of the driven member is reversed.

7. In a vehicle, a pair of axle sections, a gear mounted upon the inner end of each of said axle sections, a driving shaft extending between the faces of said gears, pinions loosely mounted upon said shaft, compensating gearing turning with said shaft and connecting the said pinions, and means for changing the position of the driving shaft so that one pinion thereon may be brought into driving connection with one of the gears, and the other pinion be brought into driving connection with the other gear whereby the direction of rotation of the axle sections may be reversed.

8. In a reversing mechanism, a driven member, a gear fitted to said member and having driving connections therewith, a drive shaft extending across the face of said gear, eccentric bearings within which the drive shaft is journaled, pinions mounted upon the drive shaft and having driving connection therewith, said pinions being on opposite sides of the driven member, and means for rotating the eccentric bearings, whereby one of the pinions on the shaft may be thrown into driving connection with the said gear, and the other pinion out of driving connection therewith, whereby the direction of rotation of the driven member is reversed.

9. In a vehicle, a gear casing, an axle section normally extending into said casing, a gear fitted to the inner end of said axle section and having driving connections therewith, a drive shaft section extending across the face of said gear, eccentric bearings within the gear casing within which the drive shaft section is journaled at either end, pinions mounted upon the drive shaft section and having driving connection therewith, said pinions being on opposite sides of the axle section, and means for rotating the eccentric bearings, whereby one pinion on the shaft section may be thrown into driving connection with the said gear, at the same time that the other pinion is thrown into driving connection therewith, whereby the direction of rotation of the axle section is reversed.

10. In a vehicle, a gear casing, a pair of axle sections normally extending into said casing, a gear fitted to the inner end of each of said axle sections and having driving connections therewith, a drive shaft section extending across the faces of said gears, eccentric bearings within the gear casing within which the drive shaft section is journaled at either end, pinions mounted upon the drive shaft section and having driving connection therewith, said pinions being on opposite sides of the axle sections, and means for rotating the eccentric bearings, whereby one of the pinions on the shaft section may be thrown into or out of driving connection with one of the said gears, and the other pinion simultaneously thrown out of or into driving connection with the other gear whereby the direction of rotation of the axle sections is reversed.

11. In a vehicle, vehicle wheels, a gear casing, a pair of axle sections extending into the casing, and connected with certain of the vehicle wheels, a driving gear mounted upon the inner end of each of said axle sections, said gears having driving connection with their axle sections, a drive shaft section extending through the casing between the faces of the said gears, a pair of pinions carried by the said shaft section and having driving connection therewith, and means for normally retaining the axle sections and the drive shaft section in engagement with their respective gears and pinions, said latter means being capable of detachment so that the said axle sections and the driving shaft section may be withdrawn from the gear casing and the gears and pinions removed from said casing without disturbing the vehicle wheels.

12. In a vehicle, vehicle wheels, a gear casing, a pair of axle sections extending into the casing, and having driving connection with certain of the vehicle wheels, a driving gear mounted upon the inner end of each of said axle sections, said gears having driving connection with the axle sections, a drive shaft section extending through the casing between the faces of the said gears, a pair of pinions carried by the said shaft sections, differential gearing connecting the pinions with the shaft section, and means for normally retaining the axle sections and the drive shaft section in engagement with their respective gears and pinions, said latter means being capable of detachment so that the said axle sections and the drive shaft section may be withdrawn from the gear casing and the gears and pinions removed from said casing without disturbing the vehicle wheels.

13. In a vehicle, vehicle wheels, a gear casing comprising a main casting and a cap plate therefor, a pair of axle sections extending into the main casting, a driving gear mounted upon the inner end of each of said axle sections, said gears having driving connection with the axle sections, a drive shaft section extending through the main casting between the faces of the said gears, a pair of pinions carried by the said shaft sections, a spider frame connected with the shaft section, planetary gearing carried by said spider frame and having driving connection with each of said pinions, and means for normally retaining the axle sections and the drive shaft section in engagement with their respective gears and pinions, said latter means being capable of detachment so that the said axle sections and the drive shaft section may be withdrawn from the gear casing and the gears and pinions removed from said casing.

14. In a vehicle, vehicle wheels, a gear casing, a pair of axle sections normally projecting into said casing, said axle sections having flattened portions at each end thereof, driving connections between the outer ends of said axle section and the vehicle wheels, bevel driving gears within the gear casing, one of said gears being fitted to the inner flattened end of each axle section, means for securing said gears to their respective axle sections, a drive shaft section within the gear casing and extending across the faces of the said gears, bevel pinions mounted upon the shaft section and having driving connection therewith, and means for normally retaining the shaft section within the gear casing and the axle sections within their gears, the construction being such that the said retaining means may be removed and the shaft section withdrawn from the gear casing and the axle sections withdrawn from the gears whereby said gears and driving pinions may be removed bodily from the gear casing without disturbing the vehicle wheels.

15. In a vehicle, vehicle wheels, a gear casing, a pair of axle sections normally projecting into said casing, said axle sections having squared portions at each end thereof, driving connections between the outer ends of said axle sections and the vehicle wheels, bevel driving gears within the gear casing, one of said gears being fitted to the inner squared end of each axle section, means for securing said gears to their respective axle sections, a drive shaft section within the gear casing and extending across the faces of the said gears, bevel pinions mounted upon the shaft section, differential gearing connecting the pinions with the shaft section, and means for normally retaining the shaft section within the gear casing and the axle sections within their gears, the construction being such that the said retaining means may be removed and the shaft section withdrawn from the gears whereby said gears, driving pinions and differential gearing may be removed bodily from the gear casing without disturbing the vehicle wheels.

16. In a vehicle, vehicle wheels, a gear casing, a pair of axle sections normally projecting into said casing, said axle sections having squared portions at each end thereof, driving connections between the outer ends of said axle sections and the vehicle wheels, bevel driving gears within the gear casing, one of said gears being fitted to the inner squared end of each axle section, means for securing said gears to their respective axle sections, a drive shaft section within the gear casing and extending across the faces of the said gears, bevel pinions mounted upon the shaft section and having driving connection therewith, said pinions being on opposite sides of the axle sections, eccentric journal bearings for the drive shaft section, said journal bearings being turned one hundred and eighty degrees apart so that when one pinion is in mesh with the rear part of one gear the other pinion will be in mesh with the other gear, means for turning the eccentric journal bearings, and means for normally retaining the shaft section within the gear casing, the construction being such that the said retaining means may be removed and the shaft section withdrawn from the gear casing and the axle sections withdrawn from the gears whereby said gears and driving pinions may be removed bodily from the gear casing without disturbing the vehicle wheels.

17. In a vehicle, an axle section, a gear wheel mounted thereon and having driving connection therewith, a drive shaft section passing across the face of said gear, driving pinions carried by said axle section and having driving connection therewith, said pinions being on opposite sides of the axle section, a gear casing, journal boxes mounted within said gear casing at the ends of the drive shaft section, bearings for the said drive shaft section mounted eccentrically in said journal boxes, and means for simultaneously turning the journal boxes so as to change the position of the shaft section and thereby throw one pinion out of mesh with the driving gear and the other pinion into mesh therewith,—whereby the direction of rotation of the axle section is reversed.

18. In a vehicle, a gear casing, an axle section projecting within said casing, a gear wheel mounted on said axle section and having driving connection therewith, a drive shaft section within the casing and passing across the face of said gear, driving pinions carried by said shaft section and having driving connection therewith, said pinions being on opposite sides of the axle section, journal boxes mounted within said gear casing at the ends of the drive shaft section, bearings for the said drive shaft section mounted eccentrically in said journal boxes, gearing connecting said journal boxes, and means for turning the journal boxes so as to change the position of the shaft section and thereby throw one pinion out of mesh with the driving gear and the other pinion into mesh therewith, whereby the direction of rotation of the axle section is reversed.

19. In a vehicle, a gear casing, a pair of axle sections projecting within said casing, a gear wheel mounted on each of said sections and having driving connection therewith, a drive shaft section passing across the face of said gears, driving pinions carried by said shaft section and having driving connection therewith, said pinions being on opposite sides of the axle sections, journal boxes mounted within said gear casing at the ends of the drive shaft sections, bearings for the said drive shaft section mounted eccentrically in said journal boxes, and means for simultaneously turning the journal boxes so as to change the position of the shaft section and thereby throw one pinion into mesh with one of the driving gears and the other pinion into mesh with the other gear.

20. In a vehicle, a gear casing, a pair of axle sections projecting into said gear casing, bevel driving gears within said casing and secured to the ends of the axle sections, the adjacent faces of said gears being concaved, a shaft section mounted in the gear casing and extending between the bevel gears, driving pinions carried upon the shaft section and adapted to be brought into driving connection with either of the said gears, differential gearing carried by said shaft section and connecting the driving pinions, said differential gearing being within the concavities of the bevel gears, journal boxes mounted within the gear casing, bearings for the shaft section mounted eccentrically within said journal boxes, and means for rotating the journal boxes so as to shift the position of the shaft section to bring the pinions thereon into and out of mesh with the gears on the axle sections for reversing the rotation of the latter.

21. In a vehicle, a gear casing, a pair of axle sections projecting into said gear casing, bevel driving gears within said casing and secured to the ends of the axle sections, a shaft section mounted in the gear casing and extending between the bevel gears, driving pinions carried upon the shaft section and adapted to be brought into driving connection with either of the said gears, differential gearing carried by said shaft section and connecting the driving pinions, journal boxes mounted within the gear casing, bearings for the shaft section mounted eccentrically within said journal boxes, gearing connecting the journal boxes, and means for rotating the journal boxes so as to shift the position of the shaft section to bring the pinions thereon into and out of mesh with the gears on the axle sections for reversing the rotation of the latter.

22. In a vehicle, a gear casing, a pair of axle sections projecting into said gear casing, bevel driving gears within said casing and secured to the ends of the axle sections, a shaft section mounted in the gear casing and extending between the bevel gears, driving pinions carried upon the shaft section and adapted to be brought into driving connection with either of the said gears, planetary gearing carried by said shaft section and connecting the driving pinions, journal boxes mounted within the gear casing, bearings for the shaft section mounted eccentrically within said journal boxes, gearing connecting the journal boxes, a cap secured to one of the journal boxes, and means engaging said cap for rotating the journal boxes so as to shift the position of the shaft section to bring the pinions thereon into and out of mesh with the gears on the axle sections for reversing the rotation of the latter.

23. In a vehicle, a gear casing, an axle section projecting into the gear casing and a gear within the casing and having driving connection with the axle section, a drive shaft mounted within the casing and extending across the face of the gear, pinions upon the drive shaft and having driving connection therewith, journal boxes mounted within the gear casing, bearings for the drive shaft eccentrically mounted in said journal boxes, one of said journal boxes being turned through 180 degrees with respect to the other, a gear upon each of said journal boxes, pinions meshing with said gears, said pinions being rigidly connected together, whereby the rotation of one journal box will transmit its motion to the other, and means for turning one of said journal boxes.

24. In a vehicle, a gear casing, an axle section projecting into the gear casing and a gear within the casing and having driving connection with the axle section, a drive shaft section mounted within the casing and extending across the face of the gear, pinions upon the drive shaft section and having driving connection therewith, journal boxes mounted within the gear casing, bearings for the drive shaft section eccentrically mounted in said journal boxes, one of said journal boxes being turned through 180 degrees with respect to the other, a gear upon each of said journal boxes, pinions meshing with said gears, said pinions being rigidly connected together, whereby the rotation of one journal box will transmit its motion to the other, a cap secured to one of the journal boxes, pins projecting from said cap, a second shaft section having driving connection with the first shaft section, a sleeve surrounding said second shaft section and having means engaging with the pins on the said cap, and means for turning said sleeve.

25. In a vehicle, a gear casing, a pair of axle sections projecting in the gear casing, a pair of gears within the casing and having driving connection with the respective axle sections, a drive shaft section mounted within the casing and extending across the faces of the gears, pinions upon the drive shaft section and having driving connection therewith, said pinions being on opposite sides of the axle sections, journal boxes mounted within the gear casing, bearings for the drive shaft eccentrically mounted in said journal boxes, a gear upon each of said journal boxes, pinions meshing with said gears, said pinions being rigidly connected together, and means for turning one of said journal boxes, the said boxes being turned one hundred and eighty degrees apart, whereby when one of the pinions is in mesh with the rear part of one of the gears the other pinion will be in mesh with the front part of the other gear, and when the journal boxes are turned the pinions will disengage from their respective gears and will mesh with the opposite gears so that the direction of motion of the axle sections is reversed.

26. In a vehicle, a pair of axle sections, bevel gears on the opposite ends of said axle sections, a drive shaft passing across the faces of said gears and inclining with respect to the planes thereof, a pair of bevel pinions carried by said shaft and having driving connections therewith, said pinions being on opposite sides of the axle sections, the pinion on one side of said axle sections being in mesh with the gear on one section and the other pinion being in mesh with the gear on the other axle section, and means for turning the drive shaft.

27. In a vehicle, a pair of axle sections, bevel gears on the adjacent ends of said axle sections, a drive shaft section passing across the faces of said gears and inclining with respect to the planes thereof, a second drive shaft section, a universal connection between said drive shaft sections, a pair of bevel pinions carried by the first shaft section and having driving connection therewith, said pinions being on opposite sides of the axle sections, the pinion on one side of said axle sections being in mesh with the gear on one axle section and the other pinion being in mesh with the gear on the other axle section, and means for driving the said second shaft section.

28. In a vehicle, a gear casing, an axle section projecting into said casing, a driving gear secured to said section, a drive shaft, a pinion carried by and having driving connection with said shaft, and means carried by said gear casing and engaging with the said gear to move the latter toward the said pinion, whereby the wear between the gear and pinion may be taken up.

29. In a vehicle, a gear casing, an axle section projecting into said casing, a driving gear secured to said section, a drive shaft, a pinion carried by and having driving connection with said shaft, a threaded nut carried by said gear casing, means connecting said nut with the said gear, whereby the latter may be moved toward the said pinion to take up the wear between the gear and pinion.

30. In a vehicle, a gear casing, an axle section projecting into said casing, a driving gear secured to said section, a drive shaft, pinions carried by and having driving connection with said shaft, said pinions being on opposite sides of the axle section, means carried by said gear casing and engaging with the said gear to move the latter toward the said pinions, whereby the wear between the gear and pinions may be taken up, and means for changing the position of said shaft to throw either pinion into mesh with the gear for reversing the direction of rotation of the axle section.

31. In a vehicle, a gear casing, a pair of axle sections extending into said gear casing, gears on said axle sections and having driving connection therewith, a shaft section passing across the faces of said gears, pinions on said shaft section for driving said gears, journal boxes for said shaft section, bearings for the shaft section mounted eccentrically in the said journal boxes, a ball head on said shaft section, a second shaft section having a cupped end fitting the ball head of the first shaft section, a pin and slot connection between the said ball head and cup, a retaining cap secured within one of the journal boxes and fitting the exterior of said cup, gearing connecting the journal boxes, and means for turning the said retaining cap whereby the journal boxes are simultaneously turned to change the position of the first shaft section with respect to the gears.

32. In a vehicle, a gear casing, a pair of axle sections extending into said gear casing, gears on said axle sections and having driving connection therewith, a shaft section passing across the faces of said gears, pinions on said shaft section, differential gearing connecting the pinions with the shaft section, journal boxes for said shaft section, bearings for the shaft section mounted eccentrically in the said journal boxes, a ball head on said shaft section, a second shaft section having a cupped end fitting the ball head of the first shaft section, a pin and slot connection between the said ball head and cup, a retaining cap secured within one of the journal boxes and fitting the exterior of said cup, gearing connecting the journal boxes, and means for turning the said retaining cap whereby the journal boxes are simultaneously turned to change the position of the first shaft section with respect to the gears.

33. In a vehicle, a gear casing, a pair of axle sections extending into said gear casing, gears on said axle sections and having driving connection therewith, a shaft section passing across the faces of said gears, pinions on said shaft section for driving said gears, journal boxes for said shaft section, bearings for the shaft section mounted eccentrically in the said journal boxes, a ball head on said shaft section, a second shaft section having a cupped end fitting the ball head of the first shaft section, a pin and slot connection between the said ball head and cup, a retaining cap secured within one of the journal boxes and fitting the exterior of said cup, a key for preventing rotation of the retaining cup within the journal box, gearing connecting the journal boxes, pins on said retaining cap, and a sleeve for turning the said retaining cap whereby the journal boxes are simultaneously turned to change the position of the first shaft section with respect to the gears.

34. In a vehicle, a gear casing, a shaft section projecting into said casing, a gear having a hub extension adapted to telescope over the end of the axle section, an end bearing for the said gear adjustably secured within the casing, and means for securing the hub of the gear to said end bearing whereby the gear will be retained in position in the casing when the axle section is removed.

35. In a vehicle, a gear casing, a shaft section projecting into said casing, a gear having a hub extension adapted to telescope over the end of the axle section, an end bearing for the said gear adjustably secured within the casing, means for securing the hub of the gear to said end bearing whereby the gear will be retained in position in the casing when the axle section is removed, said means requiring a rotation of the wheel relative to the bearing before the wheel can be removed from the casing.

36. In a vehicle, a gear casing, a shaft section projecting into said casing, a gear having a hub extension adapted to telescope over the end of the axle section, a drive shaft section, a pinion driven thereby, an adjusting nut within the gear casing, an end bearing for the hub attached to said nut, and means for securing the hub of the gear to said nut whereby the gear will be retained in position in the casing when the axle section is removed, and may be moved toward the pinion to take up wear.

37. In a vehicle, a gear casing, an axle section projecting into said casing, a gear having an extended hub adapted to telescope over the end of said axle section, said hub being provided with angular locking members on the end thereof, an adjusting nut within the gear casing, and a locking device secured to said nut and having locking members adapted to engage the locking members on the end of the hub, whereby the gear wheel is retained in the casing after the axle section is removed therefrom.

38. In a vehicle, a gear casing, an axle section projecting into said casing, a gear having an extended hub adapted to telescope over the end of said axle section, said hub being provided with angular locking members on the end thereof, an adjusting nut within the gear casing, a locking device secured to said nut and having locking members adapted to engage the locking members on the end of the hub, whereby the gear wheel is retained in the casing after the axle section is removed therefrom, and end bearings for the hub secured between the said locking device and nut.

39. In a vehicle, a gear casing, an axle section projecting into said casing, a gear having an extended hub adapted to telescope over the end of said axle section, said hub being provided with angular locking members on the end thereof, an adjusting nut within the gear casing, a locking device secured to said nut and having locking members adapted to engage the locking members on the end of the hub, whereby the gear wheel is retained in the casing after the axle section is removed therefrom, end bearings for the hub between the said locking members and nut, and means for adjusting the said locking member with respect to said nut to take up wear in the end bearings.

In testimony whereof, I hereunto affix my signature in the presence of two witnesses.

DAVID E. ROSS.

Witnesses:
GEO. J. KERNS,
LYON H. BORDNER.